J. B. LYNCH.
RESILIENT WHEEL.
APPLICATION FILED JAN. 12, 1914.

1,114,276.

Patented Oct. 20, 1914.
2 SHEETS—SHEET 1.

WITNESSES:
H. Hurst
H. E. Chase

INVENTOR.
J. B. Lynch
BY Howard P. Denison
ATTORNEY.

J. B. LYNCH.
RESILIENT WHEEL.
APPLICATION FILED JAN. 12, 1914.
1,114,276.
Patented Oct. 20, 1914.
2 SHEETS—SHEET 2.
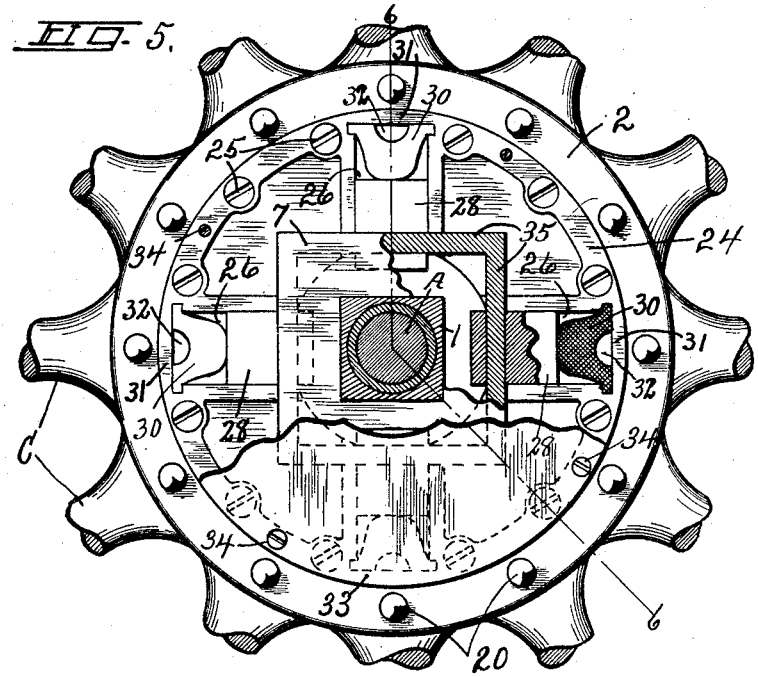
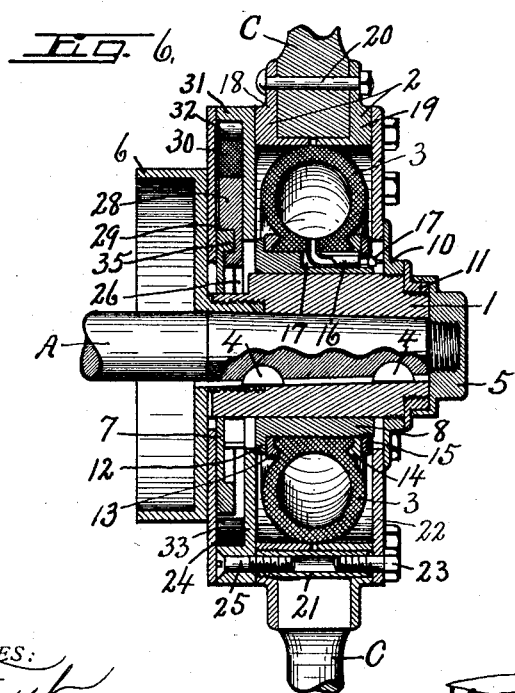
WITNESSES:
INVENTOR.
J. B. Lynch
BY
Howard P. Denison
ATTORNEY.

UNITED STATES PATENT OFFICE.

JAMES B. LYNCH, OF SYRACUSE, NEW YORK.

RESILIENT WHEEL.

1,114,276.   Specification of Letters Patent.   Patented Oct. 20, 1914.

Application filed January 12, 1914. Serial No. 811,693.

*To all whom it may concern:*

Be it known that I, JAMES B. LYNCH, of Syracuse, in the county of Onondaga, in the State of New York, have invented new and useful Improvements in Resilient Wheels, of which the following, taken in connection with the accompanying drawings, is a full, clear, and exact description.

This invention relates to certain improvements in resilient vehicle wheels involving the use of a pneumatic tube interposed between the central hub and a spoke-supporting rim resting upon the periphery of the pneumatic tube and movable radially in all directions relatively to the hub to afford a resilient action of the hub and tire-supporting rim of the wheel.

The main objects are: First. To provide a positive drive connection between the hub and spoke-supporting rim independently of the pneumatic tube so as to relieve such tube from excessive strains and wear. Second. To provide simple means for automatically maintaining the spoke-supporting rim and hub in approximately concentric relation in case the pneumatic tube should become deflated. Third. To assemble the various parts of the wheel in such manner that the pneumatic tube and spokes may be easily and quickly removed from the outer end of the wheel for repairs or replacement when desired without disturbing the positive drive connection between the hub and spoke-supporting rim. Fourth. To enable the brake drum to be easily and quickly applied to the wheel and to utilize such brake drum as a part of the guiding means for the relative radial movement of the spoke-supporting rim and hub.

Other objects of more or less importance will be brought out in the following description.

Figure 1:
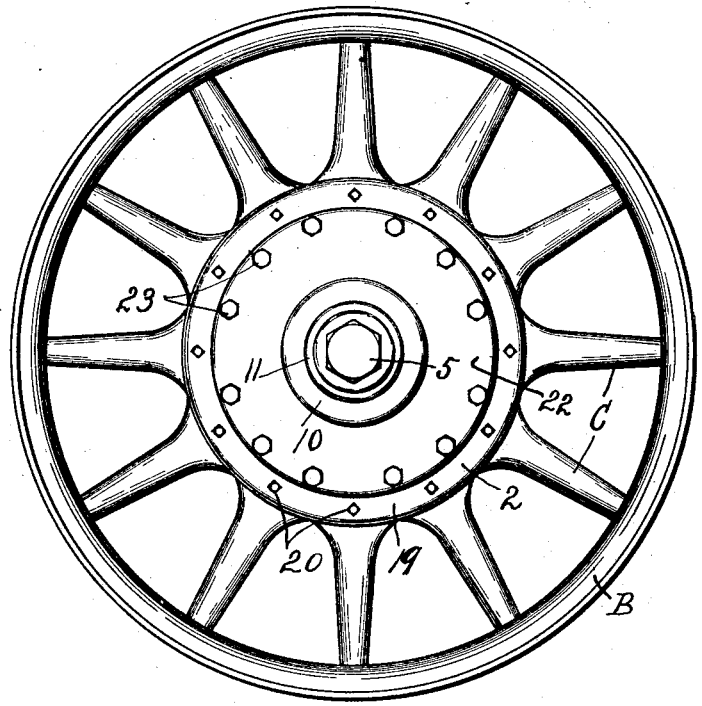
Figure 2:
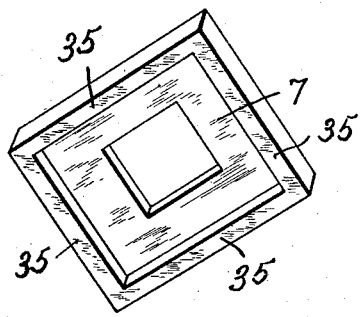
Figure 3:
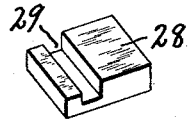
Figure 4:
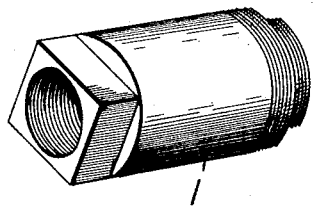

In the drawings Figure 1 is a side elevation of a resilient wheel embodying the various features of my invention. Figs. 2 and 3 are perspective views showing respectively the universal guide plate and one of the guide blocks forming a part of the positive drive connection between the hub and spoke-supporting rim. Fig. 4 is a perspective view of the detachable hub. Fig. 5 is an enlarged side elevation, partly in section, of the central portion of the wheel showing more particularly the driving connection between the hub and spoke-supporting rim. Fig. 6 is a longitudinal sectional view taken on line 6—6, Fig. 5, showing the assembled parts constituting the main features of my invention.

This wheel is adapted more particularly for motor driven vehicles, such as automobiles and the like and may be applied either to the rear or front axles, but for convenience of illustrating the wheel in relation to a brake drum, I have shown it as applied to a rear driving axle —A— and as consisting of a hub —1— mounted on the axle, a spoke-supporting rim —2— surrounding the hub but spaced some distance apart therefrom and an interposed pneumatic tube —3— which affords a resilient connection between the hub and tire-supporting rim as —B— and to which the outer ends of the spokes —C— are rigidly connected.

When the shaft —A— is the driving shaft driven in the usual manner of motor vehicles, it is keyed by suitable keys —4— to the hub —1— to transmit rotary motion thereto, the outer end of the axle being threaded and engaged by a cap nut —5— which also engages the outer end of the hub —1— to hold the wheel against endwise displacement outwardly. Under these conditions, the inner end of the hub is chambered out and threaded internally for receiving a reduced externally threaded hub of a brake drum —6— so that the hub and brake drum may rotate together with the shaft axle —A—, thus permitting the brake drum to be used in connection with the brake mechanism now in common use on motor vehicles.

The perimeter of the inner end of the hub is preferably angular or square in cross section for receiving a guide plate —7—, which is preferably square, and is provided with a central square opening fitting closely upon the adjacent square end of the hub for locking the two parts together and causing the guide plate —7— to rotate with said hub although it is evident that this plate may be otherwise secured to the hub without departing from the spirit of my invention.

The particular advantage of squaring the inner end of the hub and applying the guide plate —7— thereto in the manner described is that the two parts may be more conveniently locked together by simply slipping the plate over and upon the adjacent end of the hub, thereby establishing a positive lock without any other fastening means and at the same time permitting the plate to be easily and quickly removed from the hub by simply unscrewing the hub and brake drum one from the other.

The main body or central portion of the hub —1— is cylindrical and upon this cylindrical portion is closely fitted with an easy sliding fit a tube-supporting sleeve —8— which is also cylindrical for receiving and supporting a circular pneumatic tube —3—, the outer end of the cylindrical portion of the hub being threaded externally and engaged by an internally threaded guide flange —10— which is held in place against loosening by a lock nut —11— engaging the reduced outer threaded end of the hub as shown more clearly in Fig. 6, said lock nut being also engaged by the cap nut —5— on the end of the shaft so as to form a dust- and water-tight joint therewith.

The inner end of the sleeve —8— is enlarged to form an annular flange or abutment —12— to limit the inward movement of a tube-retaining ring or flange —13— which surrounds the inner end of the sleeve to engage and hold the adjacent side of the pneumatic tube against lateral or outward displacement. For a like purpose, a similar tire-retaining ring —14— is slidably fitted upon the outer end of the sleeve —8— to engage and hold the adjacent side of the pneumatic tube against lateral or outward displacement, the outer end of the sleeve being threaded externally and engaged by an internally threaded lock nut —15— which also serves as a means for tightening the clamping rings —13— and —14— against opposite sides of the inner portion of the pneumatic tube and at the same time enables the tube to be easily and quickly removed for repairs or replacement by a new one when desired by simply removing the cap nut —5—, the lock nut —11— and guide ring —10— together with the adjacent guide plate on the spoke-supporting rim presently described.

In order that the pneumatic tube may be inflated, I have provided it with an inwardly and laterally projecting tube —16— normally seated in a recess —17— in the periphery of the sleeve —8— and extending laterally to the outer end of the sleeve where it is provided with a valve —17— for attachment to a pump or other inflating device, not shown, it being understood that the tube —16— is wholly within the threaded opening in the nut —15— on the outer end of said sleeve so as not to interfere with the free operation of the nut or adjacent clamping ring for the pneumatic tube and at the same time permitting the pneumatic tube to be easily withdrawn from the sleeve when desired in the manner previously mentioned.

The spoke-supporting rim —2— rests upon the periphery of the pneumatic tube —9— and is provided with an annular groove in substantially the same plane as the tube for receiving the inner ends of the spokes —C—, said rim being preferably divided longitudinally midway between its ends where it rests upon the tube to form opposite spoke-clamping rings —18— and —19—, the bases of which, resting upon the tire, are spaced a slight distance apart to permit the clamping rims to be drawn up tightly against opposite faces of the spokes by means of clamping bolts —20— connecting said rings through or between the spokes to firmly hold the latter in operative position and at the same time permitting them to be easily and quickly removed by simply loosening the bolts —20— and withdrawing the outer clamping ring —19— in case one or more of the spokes should become broken and require replacement with new ones. This feature of my invention is important in that it enables the rim or tire-supporting felly —B— to be taken off at one side of the wheel and the spokes inserted thereinto and then replaced and the spokes clamped to the rim —2— in the manner described.

In addition to the bolts —20—, the spoke-clamping sleeves —18— and —19— are held against relative circumferential movement by tubular sleeves —21— arranged uniform distances apart circumferentially around the periphery of the pneumatic tube —9— and passed through registering apertures in said sections —18— and —19—, the inner ends of the tubular sleeves being threaded externally for screw connection with the inner rim sections —18— as shown more clearly in Fig. 6, while the remaining portions of the tubular sleeves are passed loosely through corresponding apertures in the outer rim section —19—, thus permitting said rim sections to be adjusted relatively to each other to firmly clamp the spokes in place, said tubular sleeves being of slightly less length than the width of the spoke-supporting rim —2— and terminate short of the opposite faces thereof so as to permit the use of suitable guide plates presently described.

The guide plate —22—, surrounding the outer end of the hub —1—, is secured by bolts —23— to the corresponding outer face of the outer clamping ring —19— and for this purpose the inner threaded ends of the bolts are engaged with threaded sockets in the adjacent ends of the tubular sleeves —21—. This guide plate extends inwardly along the outer side of the pneumatic tube —3— and partially across the inner face of the guide ring —10— against which the plate —22— is adapted to slide radially as the hub and spoke-supporting rim are moved radially relatively to each other, the central portion of the plate —22— being provided with an opening of considerably greater diameter than the external diameter of the hub so as to allow this relatively radial movement. A similar but somewhat thicker guide plate —24— is secured by bolts —25— to the opposite or inner face of the spoke-supporting rim —2— and is provided with a series of, in this instance four, radial guide ways —26— consisting of radially elongated recesses spaced uniform distance apart circumferentially or at right angles to each other and also at right angles to the adjacent sides of the rectangular plate —7— previously described for receiving and guiding radially movable blocks —28—. These blocks —28— are fitted with an easy sliding fit in their respective guide ways —26— and are provided in their inner faces with transverse grooves —29— for receiving corresponding ribs —35— extending around the margin of the plate —7— on the adjacent face thereof so as to establish sliding interlocking connection between the plate —7— and blocks —28—.

The bolts —25— by which the universal guide-plate —24— is screwed to the inner face of the spoke-supporting frame —2— are secured into threaded sockets in the adjacent ends of the sleeves —21—, thereby firmly locking said universal guide-plate to the spoke-supporting rim. This guide-plate —24— together with the plate —7— and guide blocks —28— constitute a universal driving connection between the hub and spoke-supporting rim of the wheel, said universal driving connection being positive and at the same time is capable of adjusting itself to varying relations between the hub and rim without subjecting the pneumatic tube to any driving or circumferential strains.

The guide ways —26— extend radially some distance beyond the outer ends of the guide blocks —28— to allow ample clearance for relative radial movement of the hub and rim, it being understood that the plate —24— like the plate —22— is provided with a central opening of considerably greater diameter than the external diameter of the hub.

The means for maintaining the hub and rim in approximately concentric relation in case the pneumatic tube should become deflated consists of a plurality of, in this instance four, rubber cushions or buffers —30— seated in the outer ends of the recesses and resting against the end walls —31— thereof while their inner faces rest against the outer ends of the corresponding guide blocks —28—. These centering buffers —30— are preferably made of comparatively soft rubber and the central portions of their outer ends are preferably chambered at —32— to increase their resiliency and thus permit a more efficient resilient action of the pneumatic tube under normal conditions, but in case the tube should become deflated, the cushions —30— will serve to maintain the hub and rim in approximately concentric relation or sufficiently so to enable the machine to be brought to its destination under its own power with perfect safety. It becomes apparent from this statement that it might be possible to utilize these resilient buffers or cushions —30— as the main resilient supporting means for the spoke-supporting rim to the exclusion of the pneumatic tube —3—.

In order that the universal driving connection between the hub and spoke-supporting rim and also the pneumatic tube may be protected against the entrance of dust or other foreign matter, I have provided a cover-plate —33— secured to and across one face of the chamber plate —24— by suitable fastening means as screws —34— entering threaded apertures in the adjacent side of the plate —24—, said plate —33— serving also as a guide plate in radial sliding engagement with the adjacent face of the brake drum —6— and is provided with a central opening sufficiently larger than the outside diameter of the hub —1— to allow relative radial movement of the hub and spoke-supporting rim.

It is now clear that the spoke-supporting rim is guided by the plates —22— and —33— between the flanges —10— and brake drum —6—, thereby holding the wheel against endwise or lateral movement and causing it to run true and at the same time permitting relative radial movement between the hub and spoke-supporting rim under the resilient action of the pneumatic tube —3— and cushions —30— in the manner previously explained. This relative radial movement of the hub and spoke-supporting rim is permitted by the sliding of the guide blocks —28— along the guide ribs of the plate —7— and also their respective guide ways —26— against the action of the buffers —30— and pneumatic tube —3— which, under normal conditions, serve to restore those parts into concentric relation when the load is less than the resistance afforded by said tube and cushions.

What I claim is:

A vehicle wheel comprising a hub having the outer surface of its inner end angular in cross section, a rectangular driving plate fitted upon said angular portion of the hub to rotate therewith and provided with guide flanges on each of its four sides, guide blocks slidably interlocked with said flanges, a guide plate having radial guide ways for said blocks, yielding buffers between the outer ends of the blocks and guide plate, a spoke-supporting rim surrounding the hub and secured to said guide plate, and a pneumatic tube interposed between the hub and rim.

In witness whereof I have hereunto set my hand this 6th day of January, 1914.

JAMES B. LYNCH.

Witnesses:
H. E. CHASE,
EVA E. GREENLEAF.

Copies of this patent may be obtained for five cents each, by addressing the "Commissioner of Patents, Washington, D C."